UNITED STATES PATENT OFFICE.

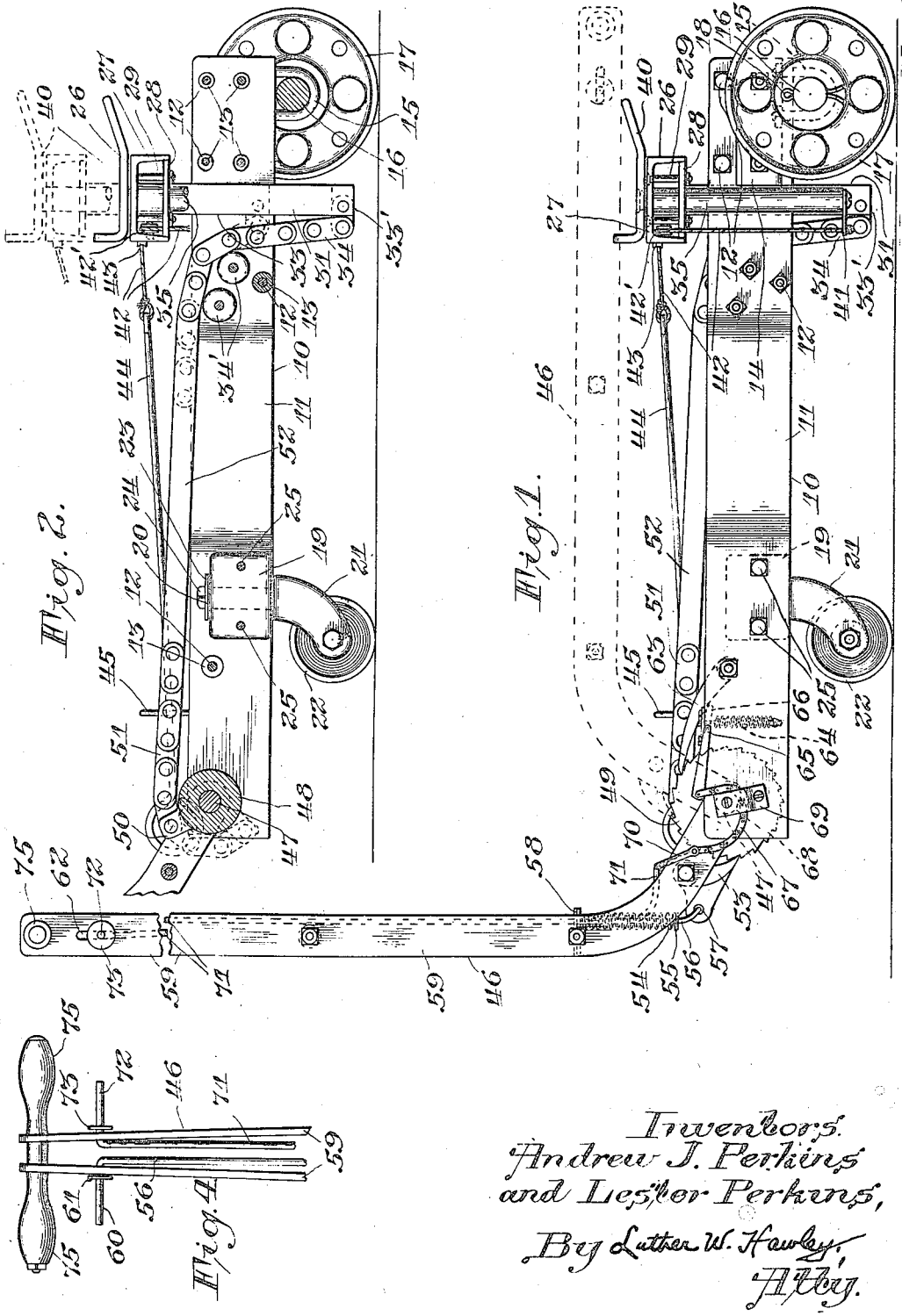

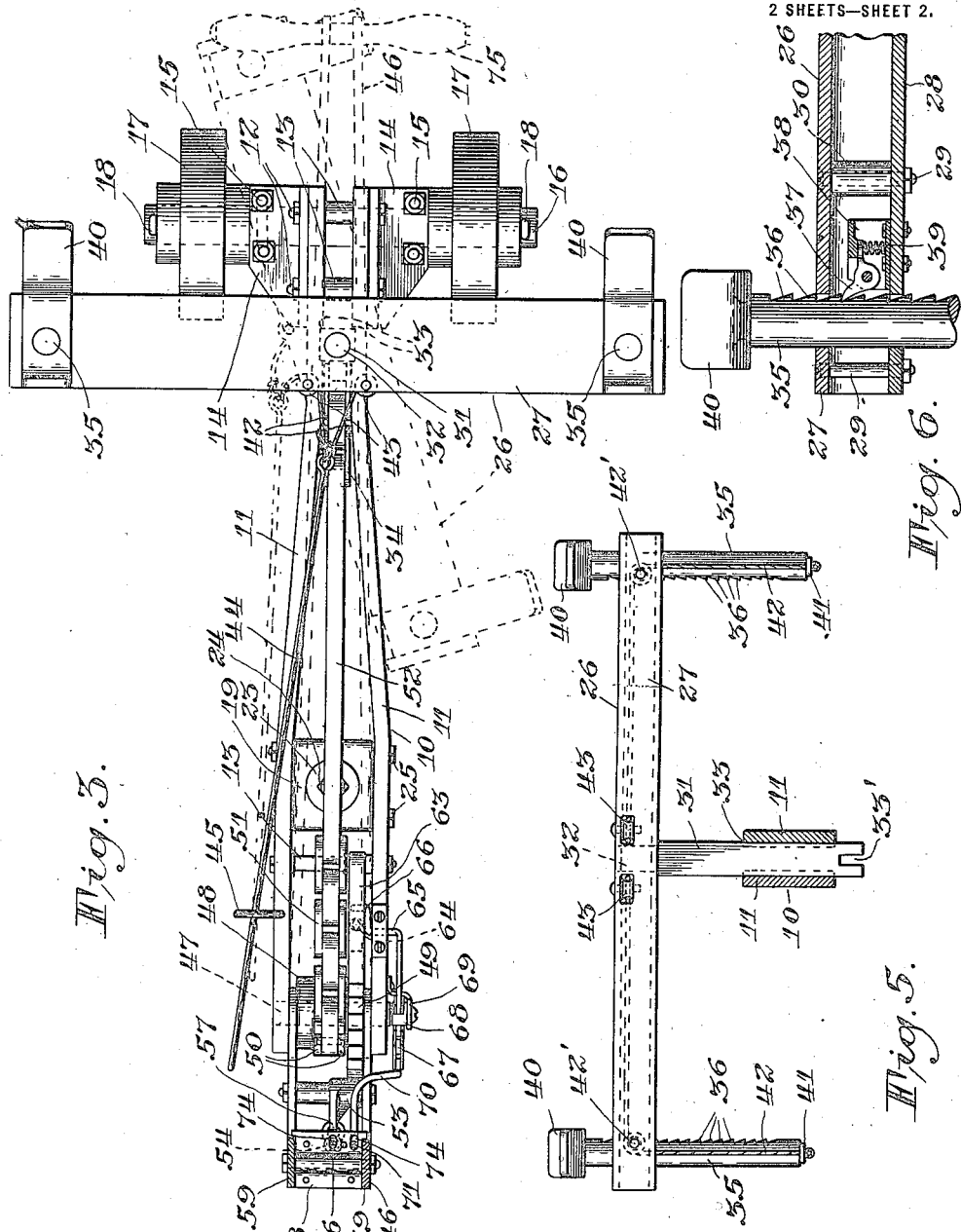

ANDREW J. PERKINS AND LESTER PERKINS, OF CHICAGO, ILLINOIS.

LIFTING-JACK FOR AUTOMOBILES.

1,322,941.  Specification of Letters Patent.  Patented Nov. 25, 1919.

Application filed August 12, 1918. Serial No. 249,570.

*To all whom it may concern:*

Be it known that we, ANDREW J. PERKINS and LESTER PERKINS, citizens of the United States, and residents, respectively, of Chicago, in the county of Cook, and State of Illinois, and of Chicago, in the county of Cook and State of Illinois, have invented certain new and useful Improvements in Lifting-Jacks for Automobiles, of which the following is a full, clear, and exact specification.

Our invention relates to lifting jacks, and more particularly to portable jacks designed for use in connection with automobiles and other heavy vehicles.

One of the objects of the invention is to provide a portable jack so constructed that it may be placed under one of the axles of the automobile, or other vehicle, and may be used in guiding the vehicle from one position to another.

A further object is to provide a jack so constructed that the operative parts thereof may be folded so as to occupy a small space.

A further object is to provide a device which is well adapted for the purpose for which it is designed, and by the use of which the vehicle may be quickly raised or lowered as desired.

One embodiment of the invention is illustrated in the accompanying drawings, and in these drawings—

Figure 1 shows our improved device in side elevation;

Fig. 2 is an elevational view, partly in section, illustrating the details of our improved lifting jack;

Fig. 3 is a top plan view of the construction shown in Fig. 1;

Fig. 4 is a front elevation of the upper end of the lifting lever; and

Figs. 5 and 6 are elevational and sectional views illustrating the construction of the transverse lifting member, and of the extensible lifting members carried thereby.

As illustrated in the drawings, our improved lifting jack comprises a longitudinal frame 10, preferably constructed of steel plates 11, which are secured together by a series of bolts 12, sleeves 13 being carried by these bolts, and spacing the plates 11 apart. The rear ends of the plates 11 have secured to their outer surfaces brackets 14, angular in section and the horizontal portions of these brackets carry U-shaped bearing members 15, in which is journaled an axle 16, which carries at its outer ends truck wheels 17, cotter pins 18 being provided between the truck wheels and the outer ends of the shafts for the purpose of securing the wheels in place. A bearing block 19 is secured in place between the plates 11, adjacent the front ends thereof, and this bearing block has swiveled therein a spindle 20, which carries at its lower end a bifurcated caster wheel support 21, in which is carried a caster wheel 22. A washer 23 is provided at the upper end of the spindle 20, and a nut 24 secures the spindle in its bearing.

As shown in Figs. 1 and 2, the bearing block 19 is secured between the plates 11 by means of bolts 25. The transverse lifting member 26 is carried adjacent the rear end of the plates 11, this member preferably being formed of a channel member 27, a plate 28 bridging the space between the flanges of said channel member. Bolts 29 secure the plate to the channel member, and spacing sleeves 30 are carried by the bolts in order to properly space these parts.

For the purpose of supporting the transverse lifting member 26, we have provided a central post 31, circular in section at its upper end, as shown at 32, the member 26 being rotatably mounted upon this circular upper end of the post 31. The portion of the post below the transverse member is square in section, the inner opposed surfaces of the plates 11 being cut away, as shown at 33, to provide vertical guideways for the reciprocation of the post and the transverse lifting member. The lower end of the post is bifurcated, as shown at 33', for the reception of one end of a flexible link connection 34, as hereinafter described.

Referring to Figs. 5 and 6, it will be seen that we have provided extensible members 35 adjacent the outer ends of the lifting members 26, these extensible members being vertically adjustable in alined apertures formed in the upper surface of the channeled member 27 and in the bridging plate 28. The members 35 are provided on their inner surfaces with a series of ratchet teeth 36, which are engaged by a pawl 37 pivotally mounted in a bracket 38 secured to the bridging plate 28, a spring 39 engaging the rear end of the pawl and forcing the pawl into engagement with the ratchet teeth carried by the extensible members 35. Supporting brackets 40 are carried at the upper ends of the members 35, and are adapted to engage with the axle of the vehicle to be lifted. In connection with our improved lifting mechanism, we have provided means for vertically adjusting the extensible members 35 prior to the operation of the lever for lifting the transverse member 26, and this construction will now be described.
Referring to Figs. 1 and 5, it will be seen that the extensible members 35 have secured thereto at their lower ends projecting plates or brackets 41, and flexible members 42 are secured to these plates for the purpose of lifting the extensible members 35. These flexible connections extend upwardly, passing through suitable apertures in the bridging plate 28, and thence over grooved pulleys or sheaves 42' to a position adjacent the center of the transverse members 26, where they again pass around sheaves 43 disposed on axes at right angles to the axes of the sheaves 42', and located in suitable slots in the front flange of the channeled member 27.
The flexible members 42 are connected at their upper ends to the rear end of a rod 44, which is slidably mounted in a loop 45 carried by one of the plates 11, the front end of this rod being disposed adjacent the front end of the plates 11, and in a position to be engaged by the operator of the jack. To release the extensible members 35 from pawls 37 the former are turned or rotated through a sufficient angle to release the pawl from the ratchet teeth 36, this angle being approximately 90 degrees.

The lifting mechanism proper, by means of which the transverse member 26 and the extensible members 35 are simultaneously lifted, will next be described.

In the embodiment of our invention illustrated, this lifting mechanism takes the form of a lever 46 pivotally connected on a transverse stub shaft 47 carried at the front end of the frame members 11. This stub shaft also carries a drum 48, to which is secured a ratchet wheel 49. The drum 48 is provided on its periphery with outwardly projecting lugs 50, to which are secured the front end of a flexible connection 51, the rear end of this connection being secured to a link 52, which in turn is connected at its rear end to the front end of the flexible connection 34 above described. In order to facilitate the movement of the flexible member 34 two rollers 34' are rotatably mounted between members 11 of the frame. It should be understood that any other form of flexible connection may be employed, if desired, and that it is not our intention to limit ourselves to the specific connections illustrated in the drawings and described above.

A pawl 53 is pivotally mounted at the lower end of the lifting lever 46, and engages the teeth of the ratchet wheel 49, being held in engagement with said teeth by means of a spring 54. This spring is interposed between a collar 55 carried by the rod 56, pivoted at 57 to the pawl, and a bridging member 58 positioned between the bars 59 which form the lifting lever 46. The rod 56 extends longitudinally of the lever 46 between the bars 59, and has its upper end bent at right angles and projecting through a slot 62 in one of the bars 59 forming an outwardly projecting handle 60, a collar 61 being carried by this handle adjacent one of the bars 59. As illustrated in Fig. 1, the portion 60 of the rod is longitudinally reciprocable in its adjacent bar 59, being mounted in the slot 62; the purpose of this rod and handle portion being to force the pawl 53 out of engagement with the teeth on the ratchet wheel 49 against the pressure of the spring 54. In order to prevent the reverse movement of the ratchet wheel 49, a pawl 63 is pivotally mounted between the plates 11, and is normally held in engagement with the teeth of the ratchet wheel by means of the spring 64, the lower end of which is connected to one of the plates 11, the upper end being connected to the pawl.

Means is also provided for lifting the pawl 63 out of engagement with the teeth of the ratchet wheel 49 in order to permit the lowering of the transverse lifting member of the jack. This means, in our present embodiment, takes the form of a crank member 65, having at one end a crank arm 66 projecting beneath the pawl 63, the intermediate portion of the crank member being pivotally mounted in one of the plates 11, and the front end of this crank member being secured to a flexible connection 67. This connection 67 passes around a roller 68 secured in the bracket 69 fixed to one of the plates 11. The end of the flexible connection 67 opposite to that connected to the crank member 65 is secured to the lower end 70 of a rod 71 similar to the rod 56, and longitudinally reciprocable between the side bars 59 of the lever 46. The upper end of the rod 71 is offset to form a handle 72, this portion of the rod being reciprocably mounted in a slot carried by the adjacent bar 59 similar to the slot 62 above described, a collar 73 being provided to prevent the retraction of the handle 72 through the slot. As shown in Fig. 3, the rods 56 and 71 pass upwardly through slots 74 formed in the bridge plate 58 between the bars 59, the rods being guided by means of these slots. In Fig. 3, in dotted line position, we have shown the transverse member 26 in folded position, and the lever 46 folded downwardly on the transverse member.

With the parts of our improved device shown in position in dotted lines, it will be seen that the device will occupy but small space, thereby facilitating the shipping of the device, and also the storage in garages or other buildings where space is valuable and must be conserved.

Having described the construction of our improved lifting jack, we will now set forth briefly the operation of the apparatus.

Assuming that an automobile is to be lifted, the jack is wheeled to the front or rear of the machine, as the case may be, and the transverse member 26 is positioned beneath the axle. The operator then, by pulling on the rod 44, will lift the extensible members 35 until they contact with the axle, and is then ready to lift the axle. This lifting is done by the movement of the lever 46 about its pivot, the pawl 53 engaging with the ratchet wheel 49 and rotating this ratchet wheel, thereby rotating the drum 48, carrying with it the flexible link connections between this drum and the lower end of the post 31 carried by the transverse member 26. The reverse rotation of the ratchet wheel is prevented by the pawl 63. When it is desired to lower the vehicle to its former position, the operator will draw the projecting portion or handle 72 of rod 71 toward the adjacent hand grip 75 of the lifting lever, thereby raising the pawl 63 out of contact with the teeth of the ratchet wheel. The load will then be carried by the lever and pawl 53, and the operator will in this way lower the vehicle by increments. After the lever has been swung toward the vehicle as far as possible, the handle 72 is released, and the pawl 63 then secures the ratchet wheel against rotation. The operator then pulls upwardly on the handle 60 carried by the rod 56, thereby retracting the pawl 53 from the ratchet wheel, and lowers the lever to the lowest position possible. The handle 60 is then released and handle 72 is again drawn upwardly, and the operation above described is repeated. In this manner it will be seen that the vehicle or automobile may be lowered in easy stages, thereby preventing jar to the machine and also to the lifting apparatus.

From the above description, it will be seen that we have provided a simple and efficient device for accomplishing the purpose desired, and a device having few parts, and which may be easily operated.

While we have described, in the above specification, one embodiment which our invention may assume, it should be understood that the invention is capable of modification, and that modification may be employed without departing from the spirit and scope of the invention as expressed in the following claims.

Claims:

1. In a lifting jack, the combination of a longitudinal body member, a transverse member carried thereby, extensible members carried by said transverse member, means including flexible connections for adjusting said extensible members, and means for lifting said transverse member.

2. In a lifting jack, a body member, a lifting member carried thereby, means for lifting said member including a lever pivoted to said body member, a ratchet wheel rotatably mounted on the pivot of said lever, flexible connections between said ratchet wheel and said lifting member, a pawl carried by said lever and normally engaging said ratchet wheel, a pawl carried by said body member and normally engaging said ratchet wheel, and reciprocable means carried by said lever for moving said pawls to inoperative position.

3. In a lifting jack, a body member, a transverse member carried thereby, extensible members carried by said transverse member, means for simultaneously vertically adjusting said extensible members, means for locking said extensible members in adjusted position, a vertical post secured to said transverse member, and means including flexible connections secured to said post at the lower end thereof for vertically adjusting said member.

In testimony whereof we affix our signatures.

ANDREW J. PERKINS.
LESTER PERKINS.